Patented Oct. 1, 1929

1,730,178

UNITED STATES PATENT OFFICE

OCTAVE VAN CUYCK, OF LOUVETAIN-TILFF, NEAR LIEGE, BELGIUM

PROCESS FOR THE MANUFACTURE OF COLORS OR THE LIKE CAPABLE OF BEING FIXED BY HEAT

No Drawing. Application filed May 7, 1926, Serial No. 107,525, and in Belgium May 8, 1925.

This invention relates to a process for obtaining colors, or the like in any form, for instance crayons, pastels, (hard, moist or semimoist) as well as in powder form, and artists, charcoal or carbon crayon, such colors fixing themselves by the application of heat upon the material on which drawings or paintings are executed with them.

These pigments can be diluted with water for use as liquid fresco-paints (and even applied in several coatings or thicknesses) according to the work required.

The invention consists in incorporating with the colors or the like, a composition of nitre and a resin or gum-resin. The nature and the proportions of this latter substance may vary to suit the different colors and their nature.

The colors or the like obtained in this way are fusible by the application of a temperature sufficiently low to glaze or vitrify them without deteriorating the paper, textile fabric, wood, ivory or other substances on which the drawings or paintings may be executed, without producing the least change in appearance of the color, its tint or the technical execution.

Moreover, these colors are then washable in water, even in hot or boiling water, after having been fixed by heat, but until they have been so fixed, they remain movable and can be rubbed into half tints or removed completely by the use of an india-rubber.

An example of manufacture of "Venetian-red" consists of:

(A) *Color matter*

| | Parts |
|---|---|
| Oxide of iron | 10 |
| Nitre | 2 |
| Glycerine | 1 |
| Flowers of sulphur | 4 | with a sufficient quantity of water to make the said ingredients into a paste, with a view to obtaining a thorough mixture.

This paste is dried and pulverized, and there is incorporated therewith according to the invention, the fixing material indicated below, prepared by fusion of the ingredients in the manner of the preparation of varnishes.

(B) *Fixing matter*

| | Parts |
|---|---|
| New Zealand kauri-gum | 10 |
| Nitre | 2 |

After cooling down the final compound, the mass is pulverized into impalpable powder, which may then be pressed, laminated or rolled into crayons or tablets for artists, draughtsmen or printers.

For certain colors the kauri-gum may be replaced by different resinous gums.

For red lakes for example, white mastic gum is used in preference.

For other tints, naturally other colors may be used and incorporated with the composition of New Zealand kauri-gum and nitre.

Having now particularly described and ascertained the nature of my said invention and in what manner the same is to be performed, I declare that what I claim is:—

1. A dry coating composition consisting of a coloring matter, nitre, resin, sulphur and glycerine, the nitre primarily functioning as a hardening agent permitting the proper preparation of the resin during the compounding of the composition, and said composition being easily removable by rubbing prior to setting and being only set by application of heat and capable of being instantaneously set by the application of a low heat such as will not injure the object to which the coating is applied.

2. A process of manufacture of a coloring coating composition involving the reduction of resin to an impalpable powdery state in the presence of nitre, which serves to harden the resin, making possible its more thorough reduction to an impalpable powder, and the association thereafter of such resin and commingled nitre with a pigment composition, and hardening of the resultant mass.

3. A Venetian red consisting of oxide of iron, ten parts; glycerine, 1 part; flowers of sulphur, 4 parts; resin, 10 parts; and nitre, 4 parts.

In testimony whereof, I have signed my name to this specification at Antwerp, Belgium, this 25th day of March 1926.

OCTAVE VAN CUYCK.